March 15, 1966  W. D. VOELKER  3,240,655
POLYURETHANE FOAM UNDER TEXTILE FABRIC
Filed April 21, 1961
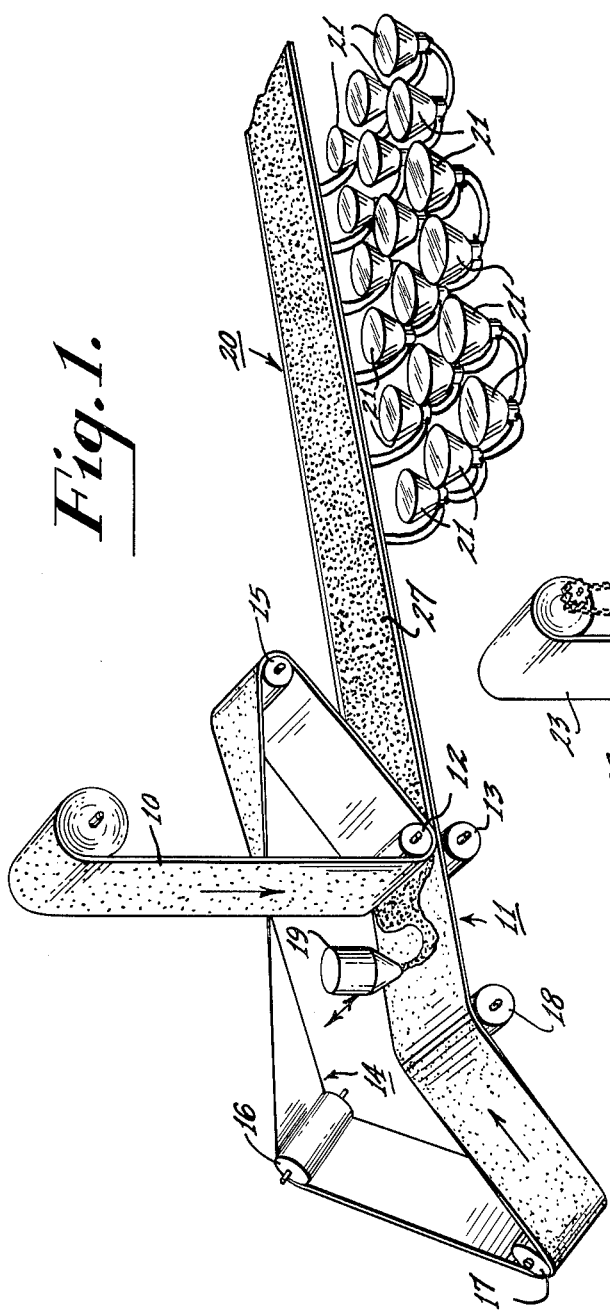
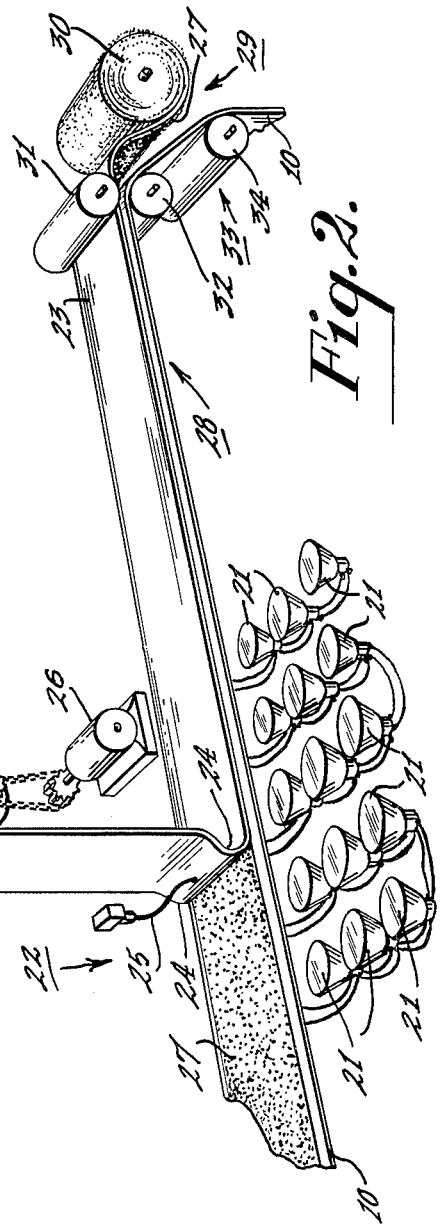
INVENTOR.
Walter D. Voelker
BY John R Eubank
ATTORNEY.

3,240,655
POLYURETHANE FOAM UNDER TEXTILE FABRIC
Walter D. Voelker, Philadelphia, Pa., assignor, by mesne assignments, to Allied Chemical Corporation, New York, N.Y., a corporation of New York
Filed Apr. 21, 1961, Ser. No. 107,615
1 Claim. (Cl. 156—501)

This application is a continuation-in-part of my application Serial No. 94,783, filed March 10, 1961, now abandoned.

This invention relates to the process and apparatus for continuous production of a thin sheet of plastic foam adhered to sheet material.

One previous method of bonding thin sheets of urethane foam to sheet materials has required fusing of the surface of the foam to the sheet material under pressure. Another previous method has required an adhesive for cementing the foam to the sheet material.

In accordance with the present invention a more satisfactory bond between the foam and the sheet material is achieved by a method for uniting the sheet material and the foam during the foam forming process. The invention consists of apparatus and method for applying a layer of plastic foam forming materials whose thickness is precisely controlled to one surface of a non-porous or impermeable sheet material, the impermeable sheet is advanced through a foam thickness controlling zone, and only after the foam has a predetermined thickness and significant adhesiveness, placing in contact with the surface of the foam under controlled light pressure an upper sheet material, whereby adhesion of the upper sheet material to the foam is obtained. If such upper sheet material is a textile fabric or other porous material, the penetration by the foam of the porous surfaces of the sheet material may be precisely controlled by this delayed laydown of the upper sheet material.

The invention can be further described by reference to the accompanying drawings, in which FIGURES 1 and 2 are schematic views of apparatus for securing foam to the bottom of a sheet material. FIGURE 1 shows an initial portion of the apparatus, and FIGURE 2 shows the remainder of the apparatus schematically.

An impermeable sheet of material such as polytetrafluoroethylene has a minimized adhesion to plastic foams. In certain embodiments of the invention, foam forming chemicals are applied to sheet material of poor adhesion characteristics, and the foaming is initiated so that the composition has a relatively light density (attributable to foam structure) and a significantly high tackiness and adhesiveness, and at this stage of the transformation of the chemicals, a sheet material is laid down on the tacky foam and securely bonded thereto during the further steps of stable foam manufacture. In those embodiments of the invention in which the bottom sheet upon which the foam forming chemicals are initially deposited has poor adhesion characteristics, such bottom sheet is peeled away from the fully foamed plastic after such top sheet is securely bonded to the stable foam. Such use of a releasing surface on which the foam can be prepared but to which it is not permanently secured can be accomplished by an endless belt of polytetrafluoroethylene coated canvas, or by the use of coated paper having a low enough cost to be expendable. The schematic drawings of FIGURES 1 and 2 show the use of such expendable release paper but the analogous use of an endless belt of releasing sheet material can be understood without illustration. Similarly, any of the many varieties of metering devices may be employed in lieu of that shown in the drawings, provided that the film of foam forming chemicals of predetermined thickness is metered onto the bottom sheet.

As shown in FIGURE 1 an impermeable sheet material 10 is power drawn through a series of zones including a coating zone 11. The impermeable sheet passes between metering rolls 12 and 13 and then through a loop 14, including passage over rolls 15, 16, 17 and 18 before reentering the coating zone 11. A reciprocating mixing head 19 traverses across the path of the forwardly moving sheet material 10 and deposits thereon a controlled amount of foam forming chemicals. The thickness of the deposited film of chemicals is further regulated by adjusting space between the metering rolls 12 and 13. The thus coated impermeable sheet material passes to a foam generation zone 20, in which the heat from infrared lamps 21 initiates the foaming of the chemicals to provide a greater thickness of coating than initially applied. As shown in FIGURE 2, the heat lamp can further promote the foaming reaction as the sheet material enters and passes through a bonding zone 22. An upper sheet of material 23 is laid down on to the partially foamed plastic at a stage of the transformation at which the foam has a low density but a significant adhesiveness and tackiness. Generally the weight of the upper sheet material 23 thus being laid down on the tacky partially foamed material will be sufficient to bring about a bonding of the foam to the upper sheet material 23. In order to maintain a slight loop 24 in the fabric being laid down, a feeler 25 can be employed to regulate the speed of the feed mechanism 26 so that the upper sheet material 23 is supplied at an appropriate rate to the advancing foam on sheet 10. The combination of the impermeable sheet 10, plastic foam 27 and upper sheet 23 advances through a foam curing zone 28 in which the polymerization and/or foam generation reactions are substantially completed, and then advances toward a product withdrawal zone 29, which may include a take-up roll 30 on which the combination of upper sheet material 23 and plastic foam 27 are rolled. The forward movement of the sheet material through the apparatus can be accomplished through power driven rolls 31 and 32. The plastic foam 27 is securely bonded to the upper sheet 23 but has no significant adhesiveness to the impermeable sheet 10 which is peeled away from the plastic foam in a separation zone 33 which may include a roller 34 contacting the impermeable sheet 10.

In the operation of the method of the invention as shown in FIGURES 1 and 2, foam forming chemicals are applied from a mixing head 19 on to an impermeable sheet 10 in a coating zone 11 and the thickness of the coating is carefully regulated by means of the metering rolls 12 and 13. The coated impermeable sheet passes through a foam generation zone 20 in which heat lamps 21 initiate the generation of foam and the transformation of the foam forming chemicals into a tacky plastic foam. While the plastic forming chemicals still retain adhesiveness and tackiness, an upper sheet of material 23 is laid down upon the foam and bonded thereto, the bond becoming more secure as the transitory sandwich structure passes through a foam curing zone 28. The bottom impermeable sheet 10 is peeled away from the transitory sandwich structure in a separation zone 33 by reason of the impermeable sheet 10 being drawn downwardly over roller 34 to provide an angle of separation from the plastic foam 27 securely bonded to the upper sheet material 23, which is collected on a product reel 30.

Some of the important features of the method include the steps of depositing foam forming chemicals on an impermeable sheet in a coating zone and the generation of a partially developed plastic foam in a foam initiation zone, and the laying down upon the thus prepared tacky foam of an upper sheet material, which bonds securely to the plastic foam as the combination is moved through a foam curing zone and toward a product removal zone.

Particular advantages are achieved by the delayed lay-down of the upper sheet material when the upper sheet material is of a permeable nature. For example, textile fabric tends to absorb throughout substantially the entire thickness thereof any coating which is of relatively low viscosity, but textile fabric can be laid down upon partially formed foam to bond therewith with a controlled penetration but without staining through the thickness of the fabric. Similarly other materials having either a permeable nature or susceptible to absorbing liquids of low viscosity can be adversely stained if contacted directly with foam forming chemicals, but can be bonded to plastic foam by the method of delayed lay-down described herein. Moreover the delayed lay-down technique is advantageous in connection with impermeable sheet material, inasmuch as the initial foam generation reactions are not impaired, but the appropriate impermeable sheet material still is adhered to the plastic foam. Thus in the coating of relatively impermeable polyvinyl alcohol, the presence of the abundance of hydroxyl groups in the sheet material does not interfere with the initial foaming reactions when the polyvinyl alcohol sheet material is laid down subsequent to the partial generation of the foam. Accordingly, the method of delayed lay-down might be employed in bonding any sheet material to a plastic foam, notwithstanding the particular advantages achieved in connection with the bonding of plastic foams to permeable and/or absorbtive sheet materials. Although the delayed lay-down is especially useful when manufacturing plastic foam having sheet material bonded to only one side thereof, it may also be useful in preparing sheet material having two faces of sheet material. Some thin plastic films are so readily stretched that problems are encountered in attempts to draw such sheet material through a coating apparatus and such stretchable sheet material can be bonded to plastic foam by the delayed lay-down technique described herein. In order to impart dimensional stability to the combination of a stretchable sheet material and a plastic foam, an opposite facing material of web structure, such as cheese cloth or wire screening may be desirable, and such web can be laid down on the impermeable sheet material some time prior to the entry of the advancing sheet into the foam initiation zone. In order to impart dimensional stability to stretchable sheet material, an auxiliary sheet of a material such as paper may be employed as a stabilizing backing sheet. If desired an impermeable sheet material can be retained in the final structure provided that its surface is of such a nature that the plastic foam can be adequately bonded thereto.

Although the delayed lay-down approach has special advantages for flexible foams, it may also be practiced in making rigid foams, in which case the product withdrawal zone includes panel cutting and panel removal means. Moreover rigid sheets can be laid down on the advancing partially formed plastic foam.

An endless belt of release sheet may be employed in lieu of the replaceable roll of release paper indicated schematically in the drawing.

Although it is convenient to describe the generic invention as a delayed lay-down, it should be understood that the securing of a sheet material, such as broadloom carpeting to partially foamed plastic can be accomplished in accordance with the present invention, either by pushing the carpet backing upwardly onto the adhesive partially formed foam or by laying down the carpet backing onto the partially formed foam. Although releasing surfaces such as polytetrafluoroethylene can be peeled away from cured polyurethane foam, it is possible to coat the bottom of a releasing sheet with foam-forming chemicals in a metering zone, and to pass it through a foam initiation zone, and into a bonding zone where an advancing lower sheet is pushed upwardly onto the adhesive partially foamed plastic. The bonding force between the release sheet and the chemicals and/or partially foamed plastic is sufficient to resist gravitational forces. In one modification of the inverted lay-down technique a release sheet coated on its underside with partially foamed plastic advances from a vacuum belt and is gently laid down upon the lower sheet for the plastic foam to bond with the lower sheet during their movement together through the plastic curing zone.

Although there are many reasons for doubting the operability of the hypothetical procedure of advancing the lower sheet (e.g. carpet backing) at a uniform level, advancing the releasing sheet at a substantially parallel upper level and spacing the releasing sheet from the top of the lower sheet to equal the intended thickness of the cured foam, the bottom of the releasing sheet having been coated with a film of foam-forming chemicals of predetermined thickness, so that the expanding foam contacts possibly penetrates a predetermined distance into the lower permeable sheet (e.g. carpet backing) and bonds therewith in the foam curing zone, such hypothetical procedure is one of the species of modifications of the inverted lay-down technique.

Obviously numerous variations are possible without departing from the concepts taught hereinabove.

The invention claimed is:

Apparatus for the continuous manufacture of a composite sheet comprising polyurethane foam and textile fabric, which apparatus comprises, in combination a pair of upper and lower metering rolls defining a metering gap; means supplying a strip of paper having a releasing surface; means directing the strip of paper with the releasing surface downwardly directed as the paper advances forwardly through the top of the metering gap under the upper metering roll; a plurality of rolls arranged and disposed to first change the direction of the strip, invert said strip and then rechange the direction of the strip whereby the strip advances forwardly over the bottom roller of the metering gap with the releasing surface as the top surface of the strip; an applicator coating polyurethane-forming chemicals onto the releasing surface of the strip as it moves horizontally toward the bottom roller of the metering gap; heating means increasing the temperature of the polyurethane forming chemicals as the strip advances horizontally beyond the metering gap, whereby the chemicals interact to form a polyurethane foam of predetermined thickness; supply means for a strip of textile fabric; means directing the strip of textile fabric onto the top surface of the advancing polyurethane foam in a textile placement zone; heating means for promoting the chemical reactions strengthening and curing the polyurethane foam and strengthening the bond between the polyurethane foam and textile fabric as a sandwich consisting of the textile fabric, polyurethane foam core, and paper bottom strip advances from the textile placement zone through a curing zone; means for stripping the releasing surface paper from the bottom of the polyurethane foam after advancing through the curing zone; and means for withdrawing as the product of the process a textile fabric having an underlayer of polyurethane foam.

References Cited by the Examiner

UNITED STATES PATENTS

| | | |
|---|---|---|
| 2,841,205 | 7/1958 | Bird. |
| 2,866,730 | 12/1958 | Potchen et al. |
| 2,956,310 | 10/1960 | Roop et al. |
| 2,962,406 | 11/1960 | Rosa. |
| 3,046,177 | 7/1962 | Hankins _____ 156—78 |

ALEXANDER WYMAN, *Primary Examiner.*

CARL F. KRAFFT, EARL M. BERGERT, *Examiners.*